(12) United States Patent
Steiner

(10) Patent No.: US 11,945,266 B2
(45) Date of Patent: *Apr. 2, 2024

(54) TIRE LOAD ESTIMATION

(71) Applicant: Infineon Technologies AG, Neubiberg (DE)

(72) Inventor: Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 686 days.

This patent is subject to a terminal disclaimer.

(21) Appl. No.: 17/114,831

(22) Filed: Dec. 8, 2020

(65) Prior Publication Data

US 2021/0086781 A1 Mar. 25, 2021

Related U.S. Application Data

(63) Continuation of application No. 16/108,244, filed on Aug. 22, 2018, now Pat. No. 10,875,539.

(51) Int. Cl.
*B60C 23/04* (2006.01)
*B60C 23/06* (2006.01)
*B60W 40/13* (2012.01)

(52) U.S. Cl.
CPC ...... *B60C 23/0474* (2013.01); *B60C 23/0449* (2013.01); *B60C 23/0476* (2013.01);
(Continued)

(58) Field of Classification Search
CPC ............ B60C 23/0474; B60C 23/0449; B60C 23/0476; B60C 23/0488; B60C 23/061;
(Continued)

(56) References Cited

U.S. PATENT DOCUMENTS 6,688,168 B1 2/2004 Elliott et al.
7,404,317 B2 * 7/2008 Mancosu ............ B60C 23/0408
73/146
(Continued)

FOREIGN PATENT DOCUMENTS

CN 1860042 A 11/2006
CN 106143002 A 11/2016
(Continued)

*Primary Examiner* — Dale W Hilgendorf
(74) *Attorney, Agent, or Firm* — Harrity & Harrity, LLP

(57) ABSTRACT

A system for estimating a tire load of a tire includes a pressure sensor configured to generate a tire pressure signal; an acceleration sensor configured to generate a tire acceleration signal; a temperature sensor configured to generate a tire temperature signal; and at least one processor configured to calculate a duration of a contact patch based on the tire acceleration signal, calculate a vehicle speed based on the tire acceleration signal, determine at least one system model coefficient based on the tire pressure signal and the tire temperature signal, and calculate the tire load of the tire using a linear system model that relates tire pressure, the duration of the contact patch, and the vehicle speed to the tire load of the tire, where the linear system model further includes the at least one system model coefficient for calculating the tire load of the tire.

13 Claims, 3 Drawing Sheets

(52) U.S. Cl.
CPC ........ B60C 23/0488 (2013.01); B60C 23/061 (2013.01); B60W 40/13 (2013.01); B60W 2530/20 (2013.01)

(58) Field of Classification Search
CPC .............. B60C 23/0486; B60W 40/13; B60W 2530/20; B60W 2040/1307
See application file for complete search history.

(56) References Cited

U.S. PATENT DOCUMENTS

| | | | |
|---|---|---|---|
| 7,536,903 B2* | 5/2009 | Schillinger | B60C 23/0488 |
| | | | 701/1 |
| 8,255,114 B2 | 8/2012 | Fink et al. | |
| 9,120,356 B2 | 9/2015 | Patel et al. | |
| 9,566,834 B2 | 2/2017 | Kandler et al. | |
| 10,875,539 B2* | 12/2020 | Steiner | B60C 23/0449 |
| 11,067,431 B2 | 7/2021 | Cyllik et al. | |
| 2003/0058118 A1 | 3/2003 | Wilson | |
| 2003/0062994 A1* | 4/2003 | Morand | B60C 23/0488 |
| | | | 340/443 |
| 2004/0130442 A1 | 7/2004 | Breed et al. | |
| 2005/0131972 A1* | 6/2005 | Chambers | G06F 1/0356 |
| | | | 708/204 |
| 2010/0199756 A1* | 8/2010 | Hanatsuka | B60C 11/24 |
| | | | 73/146 |
| 2013/0274988 A1 | 10/2013 | Reynes | |
| 2014/0114558 A1 | 4/2014 | Singh et al. | |
| 2014/0257629 A1 | 9/2014 | Singh et al. | |
| 2015/0217607 A1 | 8/2015 | Singh | |
| 2016/0129737 A1 | 5/2016 | Singh et al. | |
| 2017/0334254 A1 | 11/2017 | Limbrunner et al. | |
| 2017/0355234 A1 | 12/2017 | Dharamshi et al. | |
| 2018/0180463 A1 | 6/2018 | Cyllik et al. | |
| 2019/0025113 A1 | 1/2019 | Masago | |
| 2020/0398617 A1* | 12/2020 | Kandler | B60C 23/0469 |
| 2021/0178841 A1* | 6/2021 | Garbelli | B60C 23/06 |
| 2021/0300132 A1* | 9/2021 | Sams | B60T 8/1725 |
| 2022/0088978 A1* | 3/2022 | Soini | B60C 23/041 |
| 2022/0299405 A1* | 9/2022 | Stewart | B60W 40/12 |
| 2022/0371382 A1* | 11/2022 | Ishizuki | G01M 17/02 |

FOREIGN PATENT DOCUMENTS

| | | |
|---|---|---|
| CN | 107921828 A | 4/2018 |
| DE | 69804098 T2 | 3/2000 |
| DE | 10329700 A1 | 1/2005 |
| DE | 102006028412 A1 | 12/2007 |
| DE | 102008046269 B3 | 12/2009 |
| DE | 102014226783 A1 | 6/2016 |
| DE | 102015216210 A1 | 3/2017 |
| EP | 1293362 A2 | 3/2003 |
| EP | 1691993 B1 | 8/2006 |
| EP | 2937232 A1 | 10/2015 |
| WO | 2007064961 A2 | 6/2007 |
| WO | 2015044043 A1 | 4/2015 |
| WO | 2018050813 A1 | 3/2018 |

* cited by examiner

TIRE LOAD ESTIMATION

CROSS-REFERENCE TO RELATED APPLICATIONS

This application is a continuation of U.S. Pat. No. 10,875,539 issued on Dec. 29, 2020, which is incorporated by reference as if fully set forth.

FIELD

The present disclosure relates generally to systems and methods for estimating a load or force acting on a vehicle tire, and, more particularly, to a Tire Pressure Monitoring System (TPMS) used to for the estimation.

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The TPMS sensor module contains a pressure sensor, a microcontroller, an radio-frequency (RF) transmitter, and a coin battery cell.

While tire pressure is one aspect that may be used in vehicle safety and system performance, tire load may also be useful. Tire load is the load or force acting on each tire. Load sensors in a suspension system may exist, but these sensors may be expensive or inaccurate. Thus, an improved method of estimating tire load using TPMS may be desirable.

SUMMARY

Embodiments provide a system for estimating a tire load of a tire. The system includes a pressure sensor configured to measure an internal air pressure of the tire and generate a tire pressure signal; an acceleration sensor configured to measure an acceleration of the tire and generate a tire acceleration signal; a temperature sensor configured to measure a temperature of the tire and generate a tire temperature signal; and at least one processor configured to calculate a duration of a contact patch based on the tire acceleration signal, calculate a vehicle speed based on the tire acceleration signal, determine at least one system model coefficient based on the tire pressure signal and the tire temperature signal, and calculate the tire load of the tire using a linear system model that relates tire pressure, the duration of the contact patch, and the vehicle speed to the tire load of the tire, where the linear system model further includes the at least one system model coefficient for calculating the tire load of the tire.

According to another embodiment, a system for estimating a tire load of a tire is provided. The system includes a tire pressure monitoring system (TPMS) sensor module and a vehicle electronic control unit (ECU). The TPMS sensor module includes a pressure sensor configured to measure an internal air pressure of the tire and generate a tire pressure signal; an acceleration sensor configured to measure an acceleration of the tire and generate a tire acceleration signal; a temperature sensor configured to measure a temperature of the tire and generate a tire temperature signal; a microcontroller configured to calculate a duration of a contact patch based on the tire acceleration signal; and a transmitter electrically connected to the microcontroller unit and configured to transmit a tire pressure, a tire temperature, and the duration of the contact patch. The vehicle ECU is configured to receive the tire pressure, the tire temperature, and the duration of the contact patch from the transmitter, determine at least one system model coefficient based on the tire pressure and the tire temperature, and calculate the tire load of the tire using a linear system model that relates the tire pressure, the duration of the contact patch, and a vehicle speed to the tire load of the tire, where the linear system model further includes the at least one system model coefficient for calculating the tire load of the tire.

BRIEF DESCRIPTION OF THE DRAWINGS

Embodiments are described herein making reference to the appended drawings.

DETAILED DESCRIPTION

Figure 1:
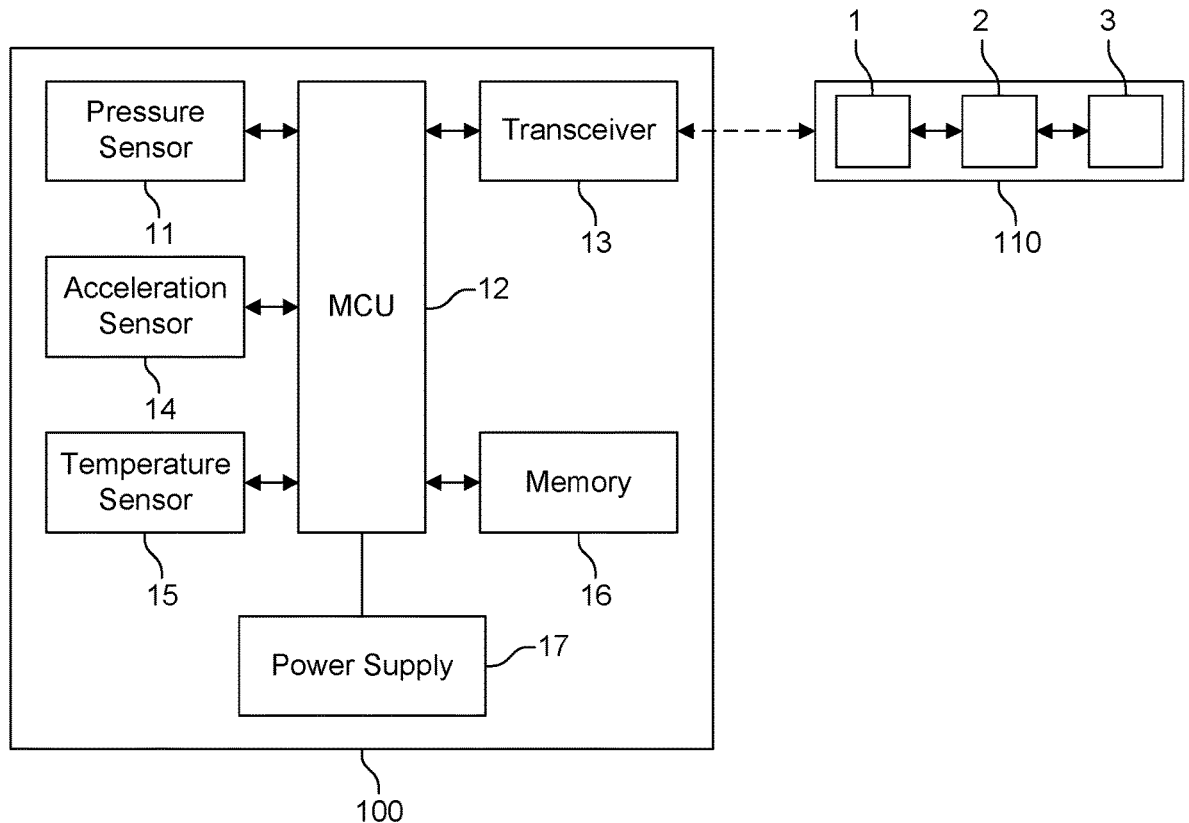
FIG. 1 illustrates a vehicle system including a Tire Pressure Monitoring System (TPMS) sensor module and a vehicle electronic control unit (ECU) according to one or more embodiments.

In the following, a plurality of details is set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

According to one or more embodiments herein, tire load for each tire is calculated using information from an intelligent tire sensor mounted on the inner-liner of the tire and applying a linear system model which correlates the output values from the tire sensor to the tire load. The coefficients of this linear system model depend on the actual tire pressure, the actual tire temperature, the tire information, and/or the wear status of the tire.

FIG. 1 illustrates a vehicle system including a monolithic TPMS sensor module 100 and a vehicle electronic control unit (ECU) 110 according to one or more embodiments. The TPMS sensor module 100 is a direct TPMS sensor mounted inside a tire. A pressure sensor 11 can be incorporated as part of a typical semiconductor technology, and may be a microelectromechanical systems (MEMS) pressure sensor 11. Therefore, the pressure sensor 11 can enable the TPMS sensor 100, which includes the pressure sensor 11, a microcontroller unit (MCU) 12, and a transceiver 13, to aid in monitoring tire pressure. The pressure sensor 11 is electrically connected to the MCU 12 and configured to measure the internal air pressure of a tire. The tire pressure sensor data may also be used to calculate system model coefficients used to calculate a tire load.

The transceiver 13 is configured to communicate with the ECU 110, and may be configured to transmit sensor data (e.g., pressure sensor data, acceleration sensor data, temperature sensor data, acceleration sensor data) or other feedback information derived from the sensor data (e.g., contact patch data, contact patch duration data, velocity/speed data, tire rotation period data, tire load data, etc.) to the ECU.

Thus, the transceiver 13 is electrically connected to the MCU 12 and is configured to transmit a signal to the vehicle ECU 110 that carries the sensor data and/or feedback information to the vehicle ECU 110. The signal may be transmitted by the transceiver 13 autonomously or in response to the transceiver 13 receiving data in the form of information, acknowledgement, or a command from the vehicle ECU 110.

The ECU 110 may include a transceiver 1 for receiving sensor data, a processing unit 2 for processing the sensor data, and a memory unit 3 for storing process sensor data or other information (e.g., tire information). The ECU 110 may be configured to receive the sensor data and derive information from the sensor data (e.g., contact patch data, contact patch duration data, velocity/speed data, tire rotation data, tire load data) or may receive one or more of such information directly from the transceiver 13 (i.e., from the TPMS sensor module 100). The transceiver 13 may be configured for bidirectional communication, or may be provided as a separate receiver and transmitter.

The TPMS sensor module 100 includes an acceleration sensor 14 electrically connected to the MCU 12 and configured to detect and/or measure a centrifugal acceleration of the tire and/or a tangential acceleration of the tire, and generate acceleration sensor data. The acceleration sensor data may be used for detecting a motion of a vehicle, calculating a vehicle velocity or speed (m/s), calculating a tire rotation period (s or ms), calculating a tire wear of a tire, calculating a traveled distance (km), and/or calculating a duration of contact patch (ms).

A contact patch is an area (e.g., circumferential length multiplied by tire width) of tire that makes contact with a driving surface, and may be determined as the tire is stationary or as it rotates. When the tire makes contact with the driving surface, the tire deforms due to the load of the vehicle. As a tire load decreases, the contact patch may decrease since less force causes less tire to be in contact with the driving surface. The opposite is also true. As a tire load increases, the contact patch may increase since more force causes more tire to be in contact with the driving surface. As used herein, "contact patch" and "contact patch length" may be used interchangeably.

The TPMS sensor module 100 may be disposed at region proximate to a monitored contact patch such that the TPMS sensor module 100 is capable of detecting the contact of the monitored contact patch with the driving surface caused by the tire deformation that occurs as a result of the contact. The duration of the monitored contact patch may be representative of a time between an initial tire deformation detected at the monitored contact patch and a final tire deformation detected at the monitored contact patch.

The acceleration of a tire-mounted TPMS module is nearly constant for the largest part of the tire revolution (apart from mechanical vibrations). In this part, the acceleration is mainly determined by the centrifugal acceleration. The centrifugal acceleration $a_{cf}$ on a circular trajectory with a radius R and a velocity v is given by Equation (1):

$$a_{cf} = v^2/R \qquad (1).$$

However, in the contact patch, when the module 100 is close to the road surface, the acceleration experienced by the TPMS sensor module 100 is nearly zero. Shortly before entering and leaving the contact patch, the tire has to deform significantly. This increases the local curvature of the TPMS sensor module's trajectory. Thus, the experienced acceleration is also increased.

Under slip-free conditions, the tire itself rolls over sections which touch the driving surface (i.e., the contact patch), while these sections are virtually stationary. Thus, a TPMS sensor module experiences virtually no acceleration when passing through this contact patch (i.e., the contact patch event). Further, assuming a freely rolling wheel, i.e., a wheel on which no torque is applied, this contact patch coincides with the angular position defined as $\phi=0$ (i.e., the angle formed normal to the ground). Because the nearly vanishing acceleration during the contact patch event is so prominent, the subsequent angular position and the duration of the contact patch event can be estimated.

The amount of time (i.e., duration) that the monitored contact patch is in contact with the driving surface may decrease as the velocity or speed of the vehicle increases, and, conversely, the duration may increase as the velocity or speed of the vehicle decreases. Thus, a duration of contact patch may be measured in milliseconds (ms), and the length of contact patch may be calculated by a contact length estimation algorithm and a duration of a monitored contact patch may be calculated by a duration of contact patch algorithm.

The tire rotation period $T_{rot}$ is the amount of time the tire takes to complete a single rotation. Thus, the tire rotation period varies based on a velocity or speed of the vehicle, and may be calculated by a tire rotation period algorithm using acceleration sensor data. One way to determine the information on the rotational rate of the tire may be by deriving $T_{rot}$ from the average radial acceleration <a> and the geometrical tire radius R via Equation (2):

$$T_{rot} = 2\pi\sqrt{(R/\langle a \rangle)} \qquad (2).$$

For tire-mounted TPMS modules, the average radial acceleration agrees reasonably well with the centrifugal acceleration calculated from Equation 1, where R is approximated by the geometrical tire radius and v by the tire's velocity. Therefore, the velocity can be calculated from the average radial acceleration.

Vehicle velocity or speed may be calculated based on a tire diameter (or radius), stored in memory 16 or at the ECU 110, and the tire rotation period $T_{rot}$. For example, vehicle velocity may be calculated by using Equation (3):

$$v = \pi d_{tire}/T_{rot} \qquad (3),$$

where v is the vehicle velocity, $d_{tire}$ is the tire diameter, and $T_{rot}$ is the tire rotation period.

A traveled distance may be calculated based on the tire diameter and a counter that counts the number of tire rotations. However, any method for calculating a traveled distance may be used. The ECU 110 may also use other convention techniques for determining traveled distance, for example, to display on an odometer.

The TPMS sensor module 100 includes a temperature sensor 15 electrically connected to the MCU 12 and configured to measure a tire temperature and generate temperature sensor data. The temperature sensor data may also be used to calculate system model coefficients used to calculate a tire load.

The TPMS sensor module 100 includes memory 16 electrically connected to the MCU 12 and configured to store information therein. Memory 16 may also be incorporated into the MCU 12 itself. For example, memory 16 may be used to store tire information for each tire, such as at least one of tire type, tire dimensions (e.g., diameter), tire mileage, or tire wear. Tire information may be separately provided for each tire and may include a brand of tire, tire dimensions, tire materials, tire stiffness parameters, tire tread information, tire season information (e.g., winter or summer tire), and other tire characteristics (e.g., tire brand information, tire dimension information, tire material information, tire stiffness parameters, tire tread information, and tire season information). Memory 16 may also store numerical values that are representative of a mileage of a tire and/or wear of the tire. These numerical values may be calculated by the MCU 12, for example, from acceleration sensor data.

Alternatively, the ECU 110 may store one or more pieces of tire information, and, may calculate the numerical values that are representative of a mileage of a tire and/or wear of the tire, for example, from acceleration sensor data and the tire information, and may store the numerical values in memory at the ECU 110.

A processing unit, either in the MCU 12 or in the ECU 110, is configured to determine a measure of the mileage of a tire by obtaining the square root of a number of measured values of the centrifugal acceleration and subsequently forming a sum of the measured values whose square root has been obtained. Given knowledge of the values of the tire radius and the installation radius of the system, the mileage can also be determined in absolute values.

In addition, the processing unit of either the MCU 12 or the ECU 110 is configured to determine a measure of the tire wear $T_{wear}$ of a tire by forming a sum of a number of measured values of the centrifugal acceleration. The processing unit can additionally be configured to determine the value for the wear by quadratically weighting an angular velocity. The angular velocity is also interchangeable with vehicle velocity or vehicle speed. Alternatively, the tire wear $T_{wear}$ may be estimated based on the total travel distance of the tire using a linear relationship between distance and tire wear.

The tire angular velocity can be calculated from the acceleration values which are compensated using the temperature value $T_{temp}$, and the tire angular velocity can be used as the redundant speed check. The following relationship exists between the angular velocity ω and the centrifugal acceleration $a_{cf}$, provided in Equation (4):

$$\omega = \frac{\sqrt{a_{cf}}}{R}, \quad (4)$$

where R is the tire radius.

The MCU 12 includes at least one processing unit (e.g., a signal processor) that receives sensor signals including various sensor data from the pressure sensor 11, the acceleration sensor 14, and the temperature sensor 15, and performs signal processing and/or conditioning thereon. For example, the at least one processing unit may convert raw sensor measurements into sensor values (e.g., tire pressure values, acceleration values, and temperature values). In addition, the at least one processing unit of the MCU 12 may calculate one or more of contact patch data, contact patch duration data, velocity/speed data, tire rotation data, tire wear data, and tire load data, as described herein.

The MCU 12 may also control one or more of the sensor devices via control signals. For example, the MCU 12 may prompt one or more sensor devices to make a measurement or may request information stored in memory 16.

In order for the MCU 12 to calculate the vehicle velocity v and the traveled distance, tire diameter information stored in memory 16 may be used along with the acceleration sensor data.

Alternatively, the MCU 12 may output sensor data to the transceiver 13 for transmission to the ECU 110. For example, the MCU 12 may output tire pressure p, duration of contact patch D, vehicle velocity v, tire wear $T_{wear}$, and tire temperature $T_{temp}$ to the transceiver 13 for transmission to the ECU 110. The transceiver 13 may transmit this information in one signal or over multiple signals. If the MCU 12 does not calculate the vehicle velocity v, the MCU 12 may also transmit (via the transceiver 13) the tire rotation period $T_{rot}$ and/or the tire diameter $d_{tire}$ to the ECU 110 such that the ECU 110 can calculate the vehicle velocity v. As noted above, the ECU 110 may also calculate the vehicle velocity v by other known techniques.

A tire load $F_{load}$ for each tire is calculated based on the input parameters discussed above and a system model for tire load estimation. In particular, the input parameters include tire pressure p, duration of contact patch D, vehicle velocity v, and tire temperature $T_{temp}$, and may further include tire wear $T_{wear}$ and tire information.

The system model for tire load estimation is a linear system model, which relates the tire pressure p, contact patch duration D, and vehicle speed v to the acting tire load on the corresponding tire. As shown in Equation (5), the system model may also include system model coefficients slope k and offset d that are determined based on tire pressure p and tire temperature $T_{temp}$.

$$F_{load} = k \cdot p \cdot D \cdot v + d \quad (5).$$

The system model coefficients slope k and offset d both depend on tire pressure p and tire temperature $T_{temp}$. Here, v may refer to either vehicle velocity or speed. However, to increase their accuracy further, system model coefficients slope k and offset d may be further determined based on tire wear $T_{wear}$ and tire information (e.g., brand of tire, tire dimensions, tire materials, tire stiffness parameters, tire tread information, tire season information (e.g., winter or summer tire), and other tire characteristics). Thus, tire wear $T_{wear}$ and/or tire information may be used as additional input parameters for calculating the tire load. The dependency of the system model coefficients k and d on tire pressure, tire temperature, tire information, and tire wear are found by characterization or calibration. If these dependencies are known, all the information is available in real time to select the proper model coefficients and derive an accurate tire load estimate. These system model coefficients may be selected by the MCU 12 or the ECU 110 based on their dependency on tire pressure and tire temperature, and, optionally, also based on their dependency on tire information and/or tire wear.

These characterizations may be stored in memory 16 for use by the MCU 12, or in the memory of the ECU 110. For example, the system model and coefficient look-up tables may be stored at the memory of the ECU 110. In this example, the ECU 110 may select system model coefficients k and d from respective look-up tables stored in the memory of the ECU 110 based on their corresponding input parameters (e.g., tire pressure p, tire temperature $T_{temp}$, tire wear (optional), and tire information (optional)) received from the TPMS sensor module 100. Thus, by adding tire temperature information, tire wear, and tire information to the modelling step for tire load may lead to higher accuracy calculations.

A power supply 17 (e.g., a battery cell) is further provided to supply power to the TPMS sensor module 100 and its components.

It will be further appreciated that the TPMS sensor module 100 may include multiple sensors of the same type. For example, the TPMS sensor module 100 may include multiple pressure sensors, multiple acceleration sensors, and/or multiple temperatures sensors. The sensor signals generated by each sensor may be used by the system to determine any relevant parameter described herein.

For example, multiple pressure signals generated by multiple pressure sensors may be used to calculate the slope and offset system model coefficients and may be used in equation (5) for calculating the tire load $F_{load}$. Values from each of the multiple pressure signals may be averaged together, and the average value may be used for the calculations. Furthermore, only a subset of the multiple pressure sensors may be used for said calculations. For example, multiple pressure sensors may be used in a redundancy scheme for functional safety, and one or more verified pressure signals may be used for the calculations.

Similarly, multiple temperature signals generated by multiple temperature sensors may be used to calculate the slope and offset system model coefficients. Values from each of the multiple temperature signals may be averaged together, and the average value may be used for the calculations. Furthermore, only a subset of the multiple temperature sensors may be used for said calculations. For example, multiple temperature sensors may be used in a redundancy scheme for functional safety, and one or more verified temperature signals may be used for the calculations.

Also, multiple acceleration signals generated by multiple acceleration sensors may be used to calculate the duration of the contact patch, the tire rotation period, the vehicle velocity, and may be used in equation (5) for calculating the tire load $F_{load}$. Values from each of the multiple acceleration signals may be averaged together, and the average value may be used for the calculations. Furthermore, only a subset of the multiple acceleration sensors may be used for said calculations. For example, multiple acceleration sensors may be used in a redundancy scheme for functional safety, and one or more verified acceleration signals may be used for the calculations.

In addition, a first acceleration sensor maybe used to sense tangential acceleration, and a second acceleration sensor maybe used to sense radial acceleration. Contact patch duration can be calculated from both radial acceleration signal (centrifugal acceleration) but also from tangential acceleration signal. Thus, a first contact patch duration may be calculated from the acceleration signal generated by the first acceleration sensor, and a second contact patch duration may be calculated from the acceleration signal generated by the second acceleration sensor. The first and the second contact patch duration may then be averaged together, and the average value may be used for the calculations (e.g., in equation (5) for calculating the tire load $F_{load}$).

Figure 2:
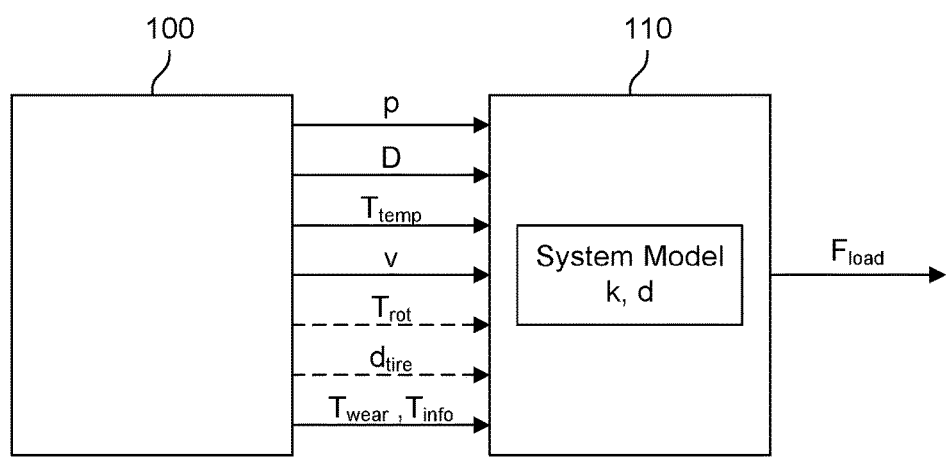
FIG. 2 illustrates a vehicle system in which a tire load is output according to one or more embodiments.

FIG. 2 illustrates a vehicle system in which a tire load is output according to one or more embodiments. The vehicle system includes the TPMS sensor module 100 and the vehicle ECU 110. In this example, the TPMS sensor module 100 transmits the tire pressure p, duration of contact patch D, tire wear $T_{wear}$, and vehicle velocity v to the ECU 110 for each tire. The vehicle velocity v may be calculated as a common parameter for all tires. For example, the ECU 110 may calculate an average value of the vehicle velocity from the vehicle velocity v received from each tire. The ECU 110 may then determine the system model coefficients k and d for the system model, calculate the tire load $F_{load}$ for each tire based on the system model and the input parameters (i.e., p, D, and v), and output the tire load $F_{load}$ to other vehicle systems.

Alternatively, instead of transmitting vehicle velocity v, the TPMS sensor module 100 may transmit the tire period rotation $T_{rot}$ and the tire diameter $d_{tire}$ to the ECU 110, and the ECU 110 may calculate the vehicle velocity v based thereon for use in calculating the tire load $F_{load}$.

Thus, the TPMS sensor module 100 may provide at least one of acceleration sensor data, tire wear information, tire information $T_{info}$, and/or temperature sensor data for determining the system model coefficients slope k and offset d. For example, the ECU 110 may calculate the tire wear information from receiving acceleration sensor data, or the TPMS sensor module 100 may calculate the tire wear information and provide it to the ECU 110. When determining the system model coefficients slope k and offset d, either one or both of the tire wear information and the tire information may be used.

As noted above, it is also possible that the TPMS sensor module 100 of each tire determines the system model coefficients slope k and offset d and calculates a corresponding tire load $F_{load}$, and transmits the tire load information to the ECU 110. Here, the system model and coefficient look-up tables would be stored at the memory 16 of the TPMS sensor module 100.

Upon calculating the tire load $F_{load}$ for each tire, the ECU 110 may further calculate the total load of the vehicle and/or calculate a center of mass of the vehicle based on a geometrical model of the vehicle stored in memory of the ECU 110. The total load and the center of mass may be used for other vehicle systems.

For example, the total load and/or the center of mass may be used for stability control algorithms and anti-lock brake systems (ABS). One or both may aid to improve vehicle stability around turns or curves, or assisting in braking control. Thus, the ECU 110 may output the total load or center of mass to one of these vehicle systems for calibrating the vehicle system based on the current load condition of the vehicle. Such actions may also be taken based on the individual tire loads calculated for each tire such that weight distribution is taken into account by one or more of these vehicle systems.

In another application, the total load may be used in fuel and electric vehicle battery systems to estimate fuel or battery consumption levels. This information may be used, for example, to calculate an estimated distance that can be traveled based on the current total load and based on current fuel and/or battery levels. Thus, a vehicle operator can be made aware of a distance that can be traveled before refueling or recharging is needed. This distance can vary based on the total load calculated by the ECU 110. Additionally or alternatively, a time remaining before refueling or recharging can be estimated and provided to the vehicle operator.

In another application, the total load may be used to calculate an optimum tire pressure for the current total load. For example, the tire pressure system may indicate to the vehicle operator whether the current tire pressure in the tires or in each tire is too low or too high from an optimum tire pressure corresponding to the current total load. The optimum tire pressure may also be extended to an optimum tire pressure range. The center of mass may also be used to determine whether the back tires or the front tires should be pressurized differently using the same principle. The same could also be applied to the right side and left side tires, or on an individual tire basis.

Figure 3:
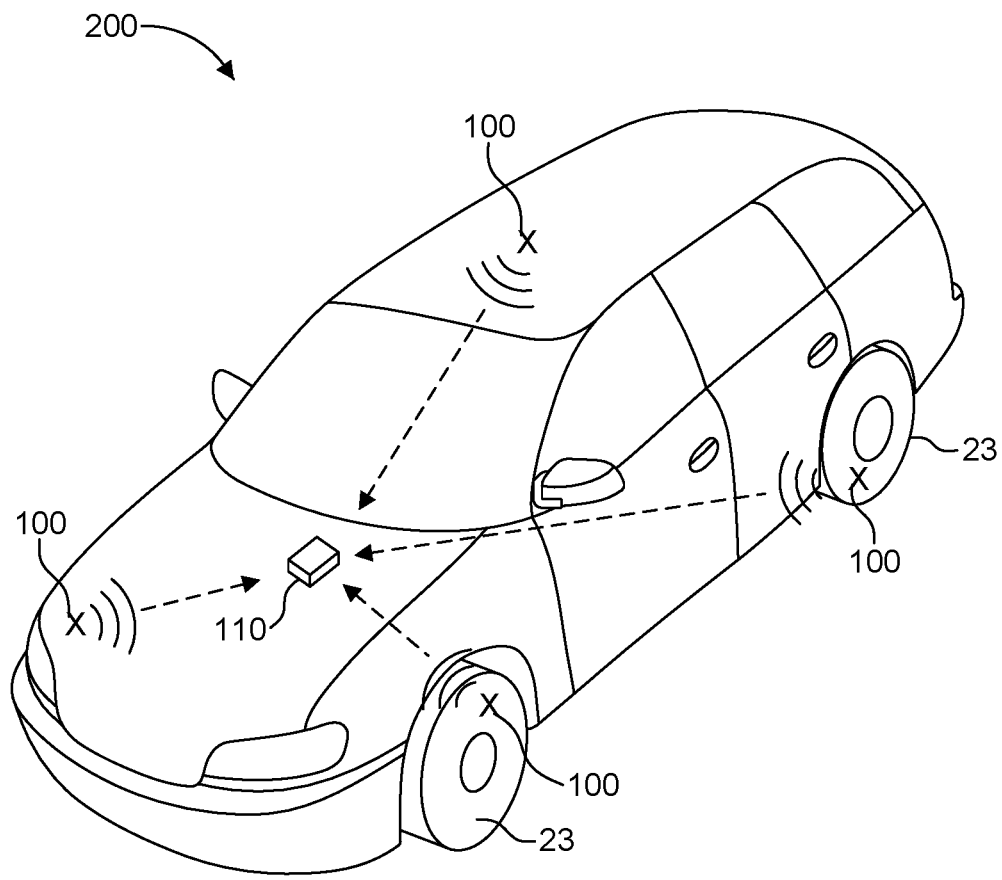
FIG. 3 illustrates a TPMS provided in a vehicle according to one or more embodiments.

FIG. 3 illustrates a TPMS provided in a vehicle 200 according to one or more embodiments. As shown in FIG. 3, the TPMS includes the ECU 110 disposed in the vehicle and TPMS modules 100 provided inside each tire 23 of the vehicle 200 and configured to communicate with the ECU 110.

Each TPMS sensor module 100 has a similar configuration described in FIGS. 1 and 2. In addition, each TPMS module 100 may have an identifier (ID) that uniquely corresponds thereto (e.g., ID 1, 2, 3, and 4). In this way the ECU 110 may be able to distinguish signals transmitted from various TPMS modules 100, identify the TPMS module 100 from which a signal originates, and determine a tire load for each tire corresponding to a respective TPMS module 100. The location of each TPMS module 100 may be mapped to its ID so that the ECU 110 has an understanding as to the location of the TPMS modules 100 (e.g., front right, back left, etc.). This location information may be used when calculating the center of mass or weight distribution, and may be further used by one or more of the vehicle systems described above.

While the TPMS sensor module 100 is illustrated as a monolithic device (i.e., single die integration), it will be understood that one or more components (e.g., the transceiver 13) may be provided on a separate die inside the integrated circuit package of the TPMS sensor module 100.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

Figure 4:
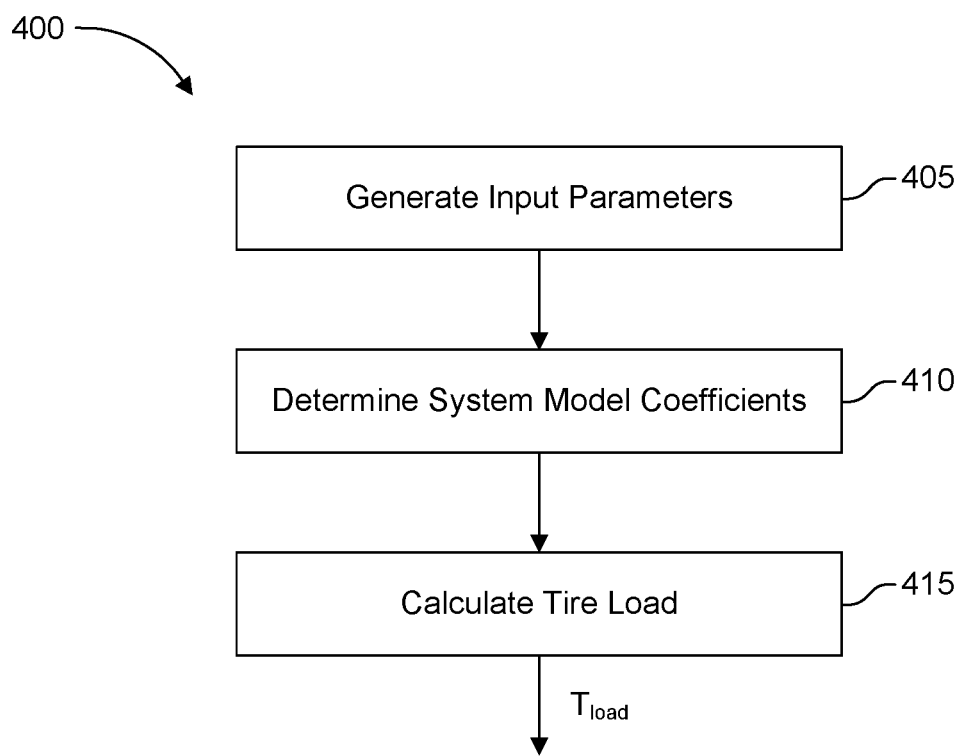
FIG. 4 illustrates a flow diagram of a method of estimating a tire load of a tire according to one or more embodiments.

It is further to be noted that methods disclosed in the specification or in the claims may be implemented by a device having means for performing each of the respective acts of these methods, and vice versa where a function or sting of functions described in context of implemented one or more devices may be performed as a method. For example, FIG. 4 illustrates a flow diagram of a method 400 of estimating a tire load of a tire according to one or more embodiments. The method 400 includes generating input parameters (e.g., p, D, and v) based on sensor data (e.g., tire pressure sensor data and acceleration sensor data) (operation 405), determining system model coefficients slope k and offset d based on sensor data (e.g., tire pressure sensor data and temperature sensor data) (operation 410), and calculating a tire load of a tire by applying the input parameters and the system model coefficients to a linear system model (operation 415). The generating of input parameters and the determining of system model coefficients may also be based on tire wear and tire information (e.g., brand of tire, tire dimensions, tire materials, tire stiffness parameters, tire tread information, tire season information (e.g., winter or summer tire), and other tire characteristics).

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A system for estimating a tire load of a tire, comprising:
at least one pressure sensor configured to measure an internal air pressure of the tire and generate at least one tire pressure signal indicating a tire pressure corresponding to the internal air pressure;
at least one acceleration sensor configured to measure an acceleration of the tire and generate at least one tire acceleration signal indicating a tire acceleration corresponding to the acceleration of the tire;
at least one temperature sensor configured to measure a temperature of the tire and generate at least one tire temperature signal indicating the temperature; and
at least one processor configured to:
calculate a duration of a contact patch based on the at least one tire acceleration signal,
obtain a tire wear of the tire based on the at least one tire acceleration signal,
calculate a vehicle speed based on the at least one tire acceleration signal,
select at least one coefficient of a system model from a plurality of stored coefficients based on the at least one tire pressure signal, the at least one tire temperature signal, and the tire wear of the tire, and
calculate the tire load of the tire using the system model that correlates the tire pressure, the duration of the contact patch, and the vehicle speed to the tire load of the tire, wherein the at least one processor uses the at least one coefficient, the tire pressure, the duration of the contact patch, and the vehicle speed in the system model for calculating the tire load of the tire.

2. The system of claim 1, wherein the at least one processor is configured to receive tire information of the tire, and determine the at least one coefficient based on the at least one tire pressure signal, the at least one tire temperature signal, the tire wear of the tire, and the tire information.

3. The system of claim 2, further comprising:
a memory configured to store the tire information, wherein the tire information includes at least one of tire brand information, tire dimension information, tire material information, tire stiffness parameters, tire tread information, and tire season information.

4. The system of claim 1, wherein the at least one processor is configured to select a further coefficient from the plurality of stored coefficients based on the at least one tire pressure signal, the at least one tire temperature signal, and the tire wear of the tire, and use the at least one coefficient, the selected further coefficient, the tire pressure, the duration of the contact patch, and the vehicle speed in the system model for calculating the tire load of the tire.

5. The system of claim 4, wherein the system model is represented by an equation:

$$F_{load}=k \cdot p \cdot D \cdot v+d,$$

wherein k is a coefficient of the at least one coefficient, d is the selected further coefficient, p is the tire pressure, D is the duration of the contact patch, v is the vehicle speed, and $F_{load}$ is the tire load of the tire.

6. The system of claim 1, further comprising:
a memory configured to store a tire diameter of the tire, wherein the at least one processor is configured to calculate a tire rotation period of the tire based on the at least one tire acceleration signal, and to calculate the vehicle speed based on the tire rotation period and the tire diameter.

7. The system of claim 1, wherein:
the plurality of stored coefficients includes a first slope coefficient and a second slope coefficient, wherein the first slope coefficient and the second slope coefficient are different,
the at least one processor is configured to select the first slope coefficient based on a first set of values corresponding to the at least one tire pressure signal, the at least one tire temperature signal, and the tire wear, and select the second slope coefficient based on a second set of values corresponding to the at least one tire pressure signal, the at least one tire temperature signal, and the tire wear, and
the first set of values and the second set of values are different.

8. A system for estimating a tire load of a tire, comprising:
tire pressure monitoring system (TPMS) sensor module, comprising:
at least one pressure sensor configured to measure an internal air pressure of the tire and generate at least one tire pressure signal indicating a tire pressure corresponding to the internal air pressure;
at least one acceleration sensor configured to measure an acceleration of the tire and generate at least one tire acceleration signal indicating a tire acceleration corresponding to the acceleration of the tire;
at least one temperature sensor configured to measure a temperature of the tire and generate at least one tire temperature signal indicating a tire temperature corresponding to the temperature of the tire;
a microcontroller configured to calculate a duration of a contact patch based on the at least one tire acceleration signal, and to obtain a tire wear of the tire based on the at least one tire acceleration signal; and
a transmitter electrically connected to the microcontroller and configured to transmit the tire pressure, the tire temperature, the duration of the contact patch, and the tire wear of the tire; and
a vehicle electronic control unit (ECU) configured to:
receive the tire pressure, the tire temperature, the duration of the contact patch, and the tire wear of the tire from the transmitter,
select at least one coefficient of a system model from a plurality of stored coefficients based on the at least one tire pressure signal, the at least one tire temperature signal, and the tire wear of the tire, and
calculate the tire load of the tire using the system model that correlates the tire pressure, the duration of the contact patch, and a vehicle speed to the tire load of the tire, wherein at least one processor is configured to use the at least one coefficient, the tire pressure, the duration of the contact patch, and the vehicle speed in the system model for calculating the tire load of the tire.

9. The system of claim 8, wherein the vehicle ECU is configured to calculate the vehicle speed.

10. The system of claim 8, wherein the microcontroller is configured calculate the vehicle speed based on the at least one tire acceleration signal, and
the transmitter is configured to transmit the vehicle speed to the vehicle ECU.

11. The system of claim 10, wherein the TPMS sensor module further comprises:
a memory configured to store a tire diameter of the tire, and
the microcontroller is configured to calculate a tire rotation period of the tire based on the at least one tire acceleration signal, and to calculate the vehicle speed based on the tire rotation period and the tire diameter.

12. The system of claim 8, wherein the microcontroller is configured to select a further coefficient from the plurality of stored coefficients based on the at least one tire pressure signal, the at least one tire temperature signal, and the tire wear of the tire, and use the at least one coefficient, the selected further coefficient, the tire pressure, the duration of the contact patch, and the vehicle speed in the system model for calculating the tire load of the tire.

13. The system of claim 12, wherein the system model is represented by an equation:

$$F_{load}=k \cdot p \cdot D \cdot v+d,$$

wherein k is a coefficient of the at least one coefficient, d is the selected further coefficient, p is the tire pressure, D is the duration of the contact patch, v is the vehicle speed, and $F_{load}$ is the tire load of the tire.

* * * * *